US011357239B2

(12) United States Patent
De Clercq et al.

(10) Patent No.: US 11,357,239 B2
(45) Date of Patent: Jun. 14, 2022

(54) COMPOSITIONS COMPRISING COCOA BUTTER

(71) Applicant: CARGILL, INCORPORATED, Wayzata, MN (US)

(72) Inventors: Nathalie De Clercq, Mouscroun (BE); Matthieu Bruno Philippe Rouvillain, Mouscroun (BE); Sidonie Saloppe, Mouscroun (BE)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 16/324,195

(22) PCT Filed: Aug. 8, 2017

(86) PCT No.: PCT/US2017/045942
§ 371 (c)(1),
(2) Date: Feb. 8, 2019

(87) PCT Pub. No.: WO2018/031569
PCT Pub. Date: Feb. 15, 2018

(65) Prior Publication Data
US 2019/0208799 A1 Jul. 11, 2019

(30) Foreign Application Priority Data

Aug. 9, 2016 (EP) .................................... 16183377

(51) Int. Cl.
| A23G 1/36 | (2006.01) |
| A23G 1/40 | (2006.01) |
| C11B 3/10 | (2006.01) |
| A23D 9/04 | (2006.01) |
| A23D 9/00 | (2006.01) |
| A23D 9/007 | (2006.01) |
| A23L 5/40 | (2016.01) |
| A23D 9/013 | (2006.01) |

(52) U.S. Cl.
CPC .................. *A23G 1/36* (2013.01); *A23D 9/00* (2013.01); *A23D 9/007* (2013.01); *A23D 9/013* (2013.01); *A23D 9/04* (2013.01); *A23G 1/40* (2013.01); *A23L 5/40* (2016.08); *C11B 3/10* (2013.01); *A23V 2002/00* (2013.01)

(58) Field of Classification Search
CPC ... A23G 1/30; A23G 1/32; A23G 1/36; A23G 1/40; A23L 5/40; A23D 9/00; A23D 9/007; A23D 9/013; A23D 9/04
See application file for complete search history.

(56) References Cited

U.S. PATENT DOCUMENTS

| 5,360,621 A | 11/1994 | Mentink et al. | |
| 6,368,655 B1 * | 4/2002 | Miller | A23G 1/04 |
| | | | 426/631 |
| 2006/0159830 A1 * | 7/2006 | Kawabata | A23G 1/36 |
| | | | 426/601 |
| 2008/0107783 A1 * | 5/2008 | Anijs | A23L 5/276 |
| | | | 426/270 |
| 2008/0311279 A1 * | 12/2008 | Kortum | A23G 1/46 |
| | | | 426/660 |
| 2009/0226562 A1 * | 9/2009 | Colarow | A23G 1/56 |
| | | | 426/11 |
| 2009/0311409 A1 | 12/2009 | Luccas | |
| 2010/0151087 A1 * | 6/2010 | Dumarche | A23C 9/1307 |
| | | | 426/103 |
| 2012/0128823 A1 * | 5/2012 | Camu | C12R 1/25 |
| | | | 426/45 |
| 2013/0183428 A1 | 7/2013 | Declercq et al. | |
| 2016/0157507 A1 * | 6/2016 | Anus | A23G 1/002 |
| | | | 426/631 |

FOREIGN PATENT DOCUMENTS

| CN | 101123886 A | 2/2008 |
| EP | 2873330 B1 | 3/2017 |
| JP | 2002165561 A | 6/2002 |
| RO | 121666 B1 | 2/2008 |
| WO | 2004000028 A1 | 12/2003 |
| WO | 2008043058 A1 | 4/2008 |

OTHER PUBLICATIONS

Bon Appetit, bonappetit.com, Nov. 13, 2007, https://www.bonappetit.com/test-kitchen/tools-test-kitchen/article/white-chocolate, pp. 1-2. (Year: 2017).*
Federal Register, "White Chocolate; Establishment of a Standard of Identity", 2002 (Year: 2002).*
Rossini, K., Noreña, C. P. Z., Brandelli, A., "Changes in the color of white chocolate during storage: potential roles of lipid oxidation and non-enzymatic browning reactions", 2011, Journal of Food Science Technology, vol. 48(3), pp. 305-311 (Year: 2011).*
De Clercq, N., "Changing Functionality of cocoa butter", Jan. 2011, PhD Thesis, Ghent University (Year: 2011).*
International Search Report dated Nov. 7, 2017 for PCT/US2017/045942 filed Aug. 8, 2017 (4 pages).
Ayala, Jose Vila, et al., "Impacts of Bleaching and Packed Coumn Steam Refining on Cocoa Butter Properties", Journal of the American Oil Chemists' Society (JAOCS), vol. 84, No. 11, Sep. 26, 2007, pp. 1069-1077, XP055412329, DE, ISSN: 0003-021X, DOI: 10.1007/s11746-007-1130-9.
De Clercq, Nathalie , et al., "Influence of cocoa butter refining on the quality of milk chocolate", Journal of Food Engineering, Barking, Essex, GB, vol. 111, No. 2, Jan. 28, 2012, pp. 412-419, XP028476675, ISSN: 0260-8774, DOI: 10.1016/J.JFOODENG.2012.01.033.
Valdecir, Luccas , et al., "Caracterização comparativa entre chocolates ao leite formulados com gordura de leite anidra e com estearina de gordura de leite", Brazilian Journal of Food Technology, vol. 17, No. 2, Jun. 1, 2014, pp. 130-138, XP055412253, DOI: 10.1590/bjft.2014.020.
"Defining and Communicating Color: The CIELAB System," 2013, Sappi Fine Paper North America.

(Continued)

*Primary Examiner* — Jeffrey P Mornhinweg
*Assistant Examiner* — Kelly P Kershaw

(57) ABSTRACT

The invention relates to a composition comprising cocoa butter, said composition having an improved whiteness. Further, the invention relates to a composition comprising cocoa butter having improved whiteness and anhydrous milk fat having improved whiteness.

12 Claims, No Drawings

(56) References Cited

OTHER PUBLICATIONS

Weiliang Wu et al: "Optimization of deacidification of low-calorie cocoa butter by molecular distillation", LWT-Food Science and Technology, vol. 46, No. 2, May 1, 2012 (May 1, 2012), pp. 563-570, XP055335077, United Kingdom, ISSN: 0023-6438, DOI: 10-1016/j.lwt.2011.10.028.

* cited by examiner

COMPOSITIONS COMPRISING COCOA BUTTER

CROSS-REFERENCE TO RELATED APPLICATIONS

This application is a national phase application of PCT/US2017/045942, filed 8 Aug. 2017, entitled COMPOSITIONS COMPRISING COCOA BUTTER, which claims the benefit of European Patent Application No. 16183377.7 filed 9 Aug. 2016, entitled COMPOSITIONS COMPRISING COCOA BUTTER, each of which is hereby incorporated by reference in its entirety.

FIELD OF THE INVENTION

The invention relates to chocolate compositions comprising cocoa butter, anhydrous milk fat and an emulsifier, said composition having an improved colour. In particular, the invention relates to chocolate compositions having improved whiteness.

BACKGROUND

Cocoa butter is an ingredient employed in many food compositions and cosmetic compositions. The most popular food ingredient comprising cocoa butter is undoubtedly chocolate and chocolate-like products. Cosmetic compositions comprising cocoa butter include for example body creams and lotions, lip butter, hair creams, make up compositions, such as lip sticks, and so on.

The industry is constantly looking to provide a diversified product portfolio to satisfy consumers need to enjoy new and different products.

When it comes to chocolate, the industry is constantly seeking to broaden the range of products it can offer as there is a constant demand for new and diversified products. Typically, chocolate and chocolate-like products come in three mains colours, dark, milk and white chocolate and chocolate-like products. Some variations exist in dark and milk chocolate and chocolate-like products, ranging from very dark to lighter versions. This is mainly due to variations in cocoa contents and the colour of the selected cocoa ingredient itself. For white chocolate and chocolate-like products, there is currently very little variation in colour. White chocolate and chocolate-like product is understood to be a chocolate or chocolate-like product that substantially does not comprise dark cocoa ingredients, such as cocoa powder and cocoa mass. Typically, a white chocolate or chocolate-like product is yellowish to white. Typical L*a*b* values for standard white chocolate and chocolate-like product on the market are L* of 85±1, a* of −1±0.4 and b* of 20±1.5. It is a need for the industry to present also in the white chocolate product or chocolate-like product with a broader palette of colours, especially towards the whiter colours. In particular for coloured compositions, it is preferable to start from whiter base ingredients than yellower base ingredients to have the least possible impact (such as colour deviation) on the final composition.

There is thus a need to provide cocoa butter based compositions with improved colour characteristics and, in particular, improved whiteness. The present invention addresses this need.

STATEMENTS OF THE INVENTION

The present invention relates to a chocolate composition comprising cocoa butter, anhydrous milk fat and an emulsifier. The cocoa butter component comprises a cocoa butter having a Lovibond red value of maximum 2, preferably maximum 1.5, more preferably maximum 1.2, more preferably maximum 1, more preferably maximum 0.7, more preferably maximum 0.5; and a Lovibond yellow value of maximum 15, preferably maximum 14, more preferably maximum 13, and more preferably maximum 12, more preferably maximum 11, more preferably maximum 10, more preferably maximum 9, more preferably maximum 8, more preferably maximum 7, more preferably maximum 6, and most preferably maximum 5.

The anhydrous milk fat component comprises anhydrous milk fat having a yellowness index of from 0.3 to 5, preferably from 0.3 to 3, more preferably from 0.3 to 2.5.

Further the invention relates to a composition having:
- an L* value of from 80 to 95, preferably 82 to 92, preferably from 85 to 91, even more preferably from 88 to 90, and
- an a* value of −5 to 5, preferably of −3 to 3, even more preferably of −2 to 2, and
- a b* value of 10 to 14, preferably 11 to 14, more preferably from 12 to 13.

Further the invention relates to the use of cocoa butter as defined above to improve the whiteness of a food composition or a cosmetic composition.

Further, the invention relates to the combined use of cocoa butter as defined above and anhydrous milk fat as defined above to improve the whiteness of a food product or a cosmetic product.

DETAILED DESCRIPTION

The present invention relates to a chocolate composition comprising cocoa butter characterized in that the cocoa butter comprises a cocoa butter having a Lovibond red value of maximum 2, preferably maximum 1.5, more preferably maximum 1.2, more preferably maximum 1, more preferably maximum 0.7, more preferably maximum 0.5; and a Lovibond yellow value of maximum 15, preferably maximum 14, more preferably maximum 13, and more preferably maximum 12, more preferably maximum 11, more preferably maximum 10, more preferably maximum 9, more preferably maximum 8, more preferably maximum 7, more preferably maximum 6, and most preferably maximum 5. Said cocoa butter as described above is referred in this description as "white" cocoa butter. The white cocoa butter may also further be characterized by its Gardner value, being maximum 2, preferably maximum 1.5.

Standard cocoa butter naturally has a yellowish colour (with typical Lovibond red values of about 15 and typical Lovibond yellow values of 120 or more). It is obtained from cocoa beans that have been ground to a cocoa liquor and then pressed. The cocoa beans may be of any type and origin, and they may be treated in any way known to a person skilled in the art (including, for example, any one or more of fermentation, dutching, roasting, and sterilisation). White cocoa butter can be obtained by bleaching standard cocoa butter. Bleaching is a process known in the art of oil and fat processing and typically makes use of bleaching earth. Such white cocoa butter can be obtained commercially for example from Cargill ZOR, under the name Refined White Cocoa Butter reference 1000158. The white cocoa butter used in the composition of the present invention is preferably a cocoa butter that has been bleached. It may also be subjected to one or more of neutralization, washing (with water), degumming, filtering and/or deodorisation. Preferably, it will be bleached and deodorised. More preferably it will be bleached, filtered, and deodorised.

Advantageously bleaching will be performed with a bleaching earth, and more advantageously with a mild activated natural bleaching earth such as Mak Lite from Geohellas. Deodorisation will preferably be performed at a temperature of above 200° C., more preferably at 200-250° C., more preferably at 210-240° C., more preferably at 220-230° C. (for example at about 220° C.).

Advantageously, the cocoa butter of the present invention, and in particular the white cocoa butter, will not comprise any cocoa butter that has been interesterified, transesterified, fractionated, hydrogenated, and/or enzymatically treated. Indeed, it is an advantage of the present invention that extra pure/white colours can be obtained using only a refined cocoa butter without further modifications or additives. It is a further advantage of the invention that the white cocoa butter will preferably have a free fatty acid content of 1 wt % or less, preferably of 0.50 wt % or less, more preferably of 0.40 wt % or less, more preferably of 0.30 wt % or less, more preferably of 0.20 wt % or less, more preferably of 0.10 wt % or less, based on the weight of the white cocoa butter.

Preferably, the composition of the present invention comprises cocoa butter in an amount of from 10 to 90 wt %, preferably from 20 to 80 wt %, more preferably from 20 to 70 wt %, even more preferably from 25 to 60 wt %, yet even more preferably from 30 to 50 wt %, yet even more preferably from 30 to 40 wt %, based on the weight of the composition. At least 50 wt %, preferably at least 60 wt %, even more preferably at least 70 wt %, yet even more preferably at least 80 wt %, yet even more preferably at least 90 wt %, yet even more preferably from 95 to 100 wt % and most preferably from 99 to 100 wt % of the cocoa butter is white cocoa butter.

It has been found that the presence of white cocoa butter as defined above allows chocolate compositions to be obtained that have a paler, more pure, whiter appearance than existing chocolate compositions. The compositions of the invention will preferably be white chocolate compositions. White chocolate compositions of the invention will advantageously be a purer white colour compared to commercially available white chocolate products. This paler more pure, whiter appearance of the compositions of the present invention can thus be obtained without the need of using additives or colourings.

The composition of the present invention further comprises anhydrous milk fat and is characterized in that said anhydrous milk fat comprises white anhydrous milk fat having a yellowness index of from 0.3 to 5, preferably from 0.3 to 3, more preferably from 0.3 to 2.5 (referred herein as white anhydrous milk fat).

White anhydrous milk fat may be obtained by vacuum distillation. It is commercially available for example from Corman under the name AMF Extra White. The white anhydrous milk fat used in the composition of the present invention is preferably obtained by subjecting an anhydrous milk fat to distillation, preferably vacuum distillation, more preferably steam vacuum distillation. Advantageously, it may also be deodorised, preferably at a temperature of more than 170° C., preferably more than 180° C., more preferably more than 190° C., more preferably more than 195° C., more preferably more than 197° C.

Preferably, the composition of the present invention comprises anhydrous milk fat in an amount of from 2 to 40 wt %, preferably from 2 to 30 wt %, more preferably from 2 to 25 wt %, even more preferably from 2 to 20 wt %, yet even more preferably from 2 to 10 wt %, based on the weight of the composition. At least 50 wt %, more preferably at least 60 wt %, even more preferably at least 70 wt %, yet even more preferably at least 80 wt %, yet even more preferably at least 90 wt %, yet even more preferably from 95 to 100 wt % and most preferably from 99 to 100 wt % of the anhydrous milk fat is white anhydrous milk fat as defined above.

It has been found that the presence of white cocoa butter and white anhydrous milk fat has a combined effect for improving the whiteness of the composition of the present invention. Although refined cocoa butters and anhydrous milk fats are already known in the industry, neither of them provided food compositions with the degree of whiteness obtained according to the present invention. The degree of whiteness that can be achieved according to the present invention has until now not been achieved. It was surprisingly found that by using these ingredients, a combined effect on the whiteness occurs and therefore improved compositions can be obtained in terms of whiteness.

The composition of the present invention further comprises an emulsifier. Suitable emulsifiers for use in the composition of the present invention include ammonium phosphatide, polyglycerol polyricinoleate (PGPR), lecithin (bleached or not bleached), sugar esters, emulsifying waxes, polyglycerol fatty acid esters, polysorbates, sorban tristearates (STSs), monoglycerides, diglycerides and any possible combinations of two or more thereof. Preferably, the emulsifier is chosen to obtain a composition having a right texture and mouthfeel, while not affecting the color of the composition. Therefore, preferably, the emulsifier will comprise ammonium phosphatide and/or PGPR, more preferably, the emulsifier will comprise or consist of ammonium phosphatide. The composition of the present invention preferably comprises from 0.1 to 2 wt %, preferably 0.2 to 1.5 wt %, more preferably 0.3 to 1 wt %, of emulsifier based on the total weight of the composition.

Thus, the composition of the present invention preferably comprises:
  a bleached cocoa butter, preferably a cocoa butter treated with a bleaching earth;
  a distilled anhydrous milk fat, preferably a vacuum distilled anhydrous milk fat; and
  an emulsifier selected from ammonium phosphatide and/or PGPR, preferably ammonium phosphatide.

The composition of the invention may also comprise one or more additional ingredients such as sugar (or other sweeteners), milk solids (such as but not limited to skimmed milk powder, whole milk powder, whey powder, or buttermilk powder) and flavoring agents or flavor enhancers (such as vanilla). The amounts of these and other possible ingredients to be used will be apparent to a person skilled in the art. Preferably, ingredients other than cocoa solids (including cocoa butter), milk solids (including anhydrous milk fat), and sugar, will not be added in amounts of more than 40 wt %, based on the total weight of the finished product.

The chocolate composition of the present invention is preferably a chocolate as defined according to European regulations for chocolate Dir. 2000/36/EC.

Preferably the chocolate of the present invention is a white chocolate. A white chocolate will typically be understood to be a chocolate composition comprising cocoa butter, milk solids and sugar, and that is devoid of any non-fat cocoa solids (i.e. cocoa particles such as cocoa powder). Thus, the composition of the present invention will preferably not comprise any non-fat cocoa solids. Preferably, the cocoa butter and anhydrous milk fat will be present in the chocolate composition in the amounts required for white chocolate as defined in the European directive Dir. 2000/36/EC. Thus, a white chocolate composition according to the present invention will preferably comprise at least 20 wt % cocoa butter (of which at least 50 wt %, at least 60 wt %, at least 70 wt %, at least 80 wt %, at least 90 wt %, 95 to 100 wt % or 99 to 100 wt % of the cocoa butter is white cocoa butter), and at least 14 wt % dry milk solids (including anhydrous milk fat). The anhydrous milk fat is advantageously present in the white chocolate composition in an amount of not less than 3.5 wt % (of which at least 50 wt %, at least 60 wt %, at least 70 wt %, at least 80 wt %, at least 90 wt %, from 95 to 100 wt %, or from 99 to 100 wt % of the anhydrous milk fat is white anhydrous milk fat). The wt % of each of cocoa butter, milk solids and anhydrous milk fat is expressed relative to the total weight of cocoa butter, milk solids, and sugar in the composition. The milk solids may be obtained by partly or wholly dehydrating whole milk, semi- or full-skimmed milk, cream, or from partly or wholly dehydrated cream, butter or milk fat.

Preferably, the compositions of the invention will not comprise any animal fats other than those derived solely from milk and/or any flour, or granular or powdered starch.

The chocolate composition may also be a chocolate-like product or compound chocolate. Such compositions are well known in the art and should be understood to be products comprising sweetener and fat, optionally milk and cocoa ingredients. Preferably the chocolate-like product or compound will not contain any cocoa solids.

Advantageously the composition of the present invention has: an $L^*$ value of from 80 to 95, preferably 82 to 92, preferably from 85 to 91, even more preferably from 88 to 90, and an $a^*$ value of −5 to 5, preferably of −3 to 3, even more preferably of −2 to 2, and a $b^*$ value of 10 to 14, preferably 11 to 14, more preferably from 12 to 13.

$L^*a^*b^*$ values are commonly used in the art to determine the color of a product according to the $L^*$, $a^*$, $b^*$ color space CIE 1976. Typical $L^*a^*b^*$ values for standard white chocolate on the market are $L^*$ of 85±1, $a^*$ of −1±0.4 and $b^*$ of 20±1.5.

The chocolate composition of the present invention can be used in the production of chocolate products such as chocolate bars, bonbons, pralines, toffees and the like. It can also be used in the form of a coating for frozen desserts, preferably frozen dairy products, and confectionery, in particular ice cream; it can be an inclusion, such as drops or layers, in frozen dessert, preferably frozen dairy products, such as ice cream or frozen yogurt, in dairy desserts such as yogurt, dairy creams, creamy desserts and the like. The chocolate composition may also be used as a filling inside, for example, a confectionery or bakery product. Especially for colored products, such as for example colored fillings, the lack of color of the base ingredients (cocoa butter and/or anhydrous milk fat) is advantageous, in order to have as little influence as possible on the color of the final colored product. When combined with other colors (pigments or food dyes for instance), the base ingredient will not tarnish them or at least will tarnish them less than when more yellowish base ingredients would be used.

The invention further relates to the use of white cocoa butter as defined herein to increase the whiteness of food compositions or cosmetic compositions, preferably chocolate compositions, more preferably white chocolate compositions.

Preferably, the invention relates to the use of white cocoa butter as defined herein and white anhydrous milk fat as defined herein to increase the whiteness of food compositions, preferably chocolate compositions, more preferably white chocolate compositions.

Preferably, the invention relates to the use of white cocoa butter as defined herein and white anhydrous milk fat as defined herein and an emulsifier, wherein the emulsifier is selected from ammonium phosphatide, polyglycerol polyricinoleate (PGPR), lecithin (bleached or not bleached), sugar esters, emulsifying waxes, polyglycerol fatty acid esters, polysorbates, sorban tristearates (STSs), monoglycerides, diglycerides and any possible combinations of two or more thereof, the emulsifier preferably being ammonium phosphatide and/or PGPR, to increase the whiteness of food compositions, preferably chocolate compositions, more preferably white chocolate compositions.

The use above advantageously provides an increased whiteness, to provide a brighter or more neutral base for food products, in particular food products comprising colouring.

METHODS OF MEASUREMENT

Lovibond Red and Lovibond Yellow

Lovibond red and Lovibond yellow values are measured according to NEN 27608 2010, International standard determination of Lovibond colour of animal and vegetable fats and oils using automatic instrumentation and 5.25 inch cuvettes.

Gardner Index

The Gardner index is measured according to ASTM D 1544 standard method for colour of transparent liquids.

Yellowness Index

Measurement with Minolta colorimeter CR-5. A light source (Pulsed xenon lamp) passes through a cell containing the sample to be measured. 3 values are recorded: X, Y and Z. Calculation of the yellowness index is made as follows:

$$coloration = (12.8X - 10.6Z)/Y$$

This method of calculation is realized according to the American standard method for testing and materials (ASTM) D1925.

$L^*$, $a^*$, $b^*$ Values

Measurement is done using a MINOLTA CM2500D spectrophotometer using CIELAB reference by defining:
  $L^*$: luminance, an index for the amount of 'light' present in the product.
  $a^*$: an index of the red component if positive, and index of the green component if negative.
  $b^*$: and index of the yellow component if positive, an index of the blue component if negative.

Equipment Used Is

MINOLTA Spectrophotometer CM2500D computer assisted.
Software MINOLTA SPECTRA MAGIC version 1.00.
Plastic Petri dish (55 mm diameter).
Oven set at 50° C.
Black body: light trap CM.A32 used to perform zero calibration.

White Stallion CM.A145used to perform white calibration
Operating parameters are set as follows:
Color space: L*, a*, b*
Observer: 10°
Illuminant: D65
Specular component: SCI+SCE
Calibration is done with the black calibration standard CM.A32and then with the wither calibration standard CM.A145. A sample of the product to be measured is placed in the oven until it reaches a temperature of 50° C. (+/−2° C.), measurement is done when the sample is at 50° C. (+/−2° C.). The sample should be homogeneous. The Petri dish is filled with a maximum of product, the lid of the petri dish is put on the petri plate and the whole petri dish is placed on the colour meter for measurement. Care is taken not to touch the bottom of the petri dish to avoid fingerprints.

The invention will now be illustrated in the following non-limiting example.

EXAMPLES

Example 1: Preparation of White Cocoa Butter

Pure prime pressed cocoa butter is neutralised with an excess amount of NaOH to saponify the free fatty acids present in the cocoa butter and subsequently washed with water in a reaction vessel. In a next step, to the oil and water phase are separated by centrifugation and the oil phase is dried at 90° C. The cocoa butter is then bleached with 2% bleaching earth (e.g. Maklite from Geohellas) in a heated vessel equipped with a stirring device, under vacuum. After a filtration step through a plate filter, the cocoa butter is further steam deodorised at 220° C. and at a vacuum between 3-5 mbar.

The obtained, refined cocoa butter is a white cocoa butter according to the invention.

Example 2: Standard White Chocolate Compared to White Chocolate According to the Present Invention Chocolate is produced on a 5 kg scale, according to standard practice. The list of ingredients is given in table 1.

In the first step sugar, skimmed milk powder, flavoring and a first part of the cocoa butter are mixed in a planetary mixer. Cocoa butter is added to obtain a fat content of about 26%. Then, particle size of this mixture is reduced by refining on a 3 roll refiner to a fineness of <30µm. The refined product is then conched in a Bülhler Elk'olino conche. Conching consist of two phases: a dry and liquid conching. At the beginning of the dry phase 1% of the second part of the cocoa butter is added and the mixture is then conched for 4 hours at a maximum temperature of 55° C. In the liquid phase, the emulsifiers, the milk fat and the remaining amount of the second part of the cocoa butter are added to obtain the desired rheological properties.

TABLE 1 chocolate ingredients

| Ingredient (in wt %) | Sample A | Sample B | Sample C | Sample D |
| --- | --- | --- | --- | --- |
| First part of standard cocoa butter (Cargill spec ref 1000150) | 20.01 | | | 20.01 |
| First part of Refined White Cocoa Butter (Cargill, ZOR, spec ref 1000158) | | 20.01 | 20.01 | |
| Second part of standard cocoa butter (Cargill, spec ref 1000150) | 10 | | | 10 |
| Second part of Refined White Cocoa Butter (Cargill, ZOR, spec ref 1000158) | | 10 | 10 | |
| Sugar | 47.34 | 47.34 | 47.34 | 47.34 |
| Skimmed milk powder | 16.29 | 16.29 | 16.29 | 16.29 |
| Anhydrous milk fat - standard | 5.72 | | 5.72 | |
| Anhydrous milk fat - white (Corman) | | 5.72 | | 5.72 |
| Emulsifier | 0.63 | 0.63 | 0.63 | 0.63 |
| Natural vanilla flavoring | 0.01 | 0.01 | 0.01 | 0.01 |

Sample A: standard white chocolate; Sample B: white chocolate according to the invention; Sample C: white chocolate with white cocoa butter and standard anhydrous milk fat; Sample D: white chocolate with standard cocoa butter and white anhydrous milk fat.

The chocolate samples are measured for their L*, a* and b* values and the results are given in table 2 below. A white chocolate from Lindt, available commercially, has also been measured.

TABLE 2 colour values

| | Sample A | Sample B | Sample C | Sample D | Sample E |
| --- | --- | --- | --- | --- | --- |
| L* | 87.7 | 90.41 | 90.02 | 87.83 | 88.29 |
| a* | −1.11 | −2.02 | −1.36 | −1.49 | −1.08 |
| b* | 20.36 | 12.47 | 14.74 | 19.21 | 15.63 |

Sample E: White chocolate Lindt (Extra Velouté, Blanc - commercially available)

The results show the improved whiteness of the white chocolate according to the present invention, in comparison to a standard white chocolate using standard cocoa butter and standard anhydrous milk fat, in comparison to "whiter chocolates" prepared using only one extra-refined fat (i.e. either white cocoa butter or white anhydrous milk fat, but not both) and in comparison to a commercially available whiter chocolate.

The invention claimed is:
1. A chocolate composition comprising:
   20 to 70 wt % cocoa butter having a Lovibond red value of maximum 2, and a Lovibond yellow value of maximum 15;

2 to 25 wt % anhydrous milk fat having a yellowness index of from 0.3 to 5; and 0.1 to 2.0 wt % of an emulsifier selected from the group consisting of ammonium phosphatide, polyglycerol polyricinoleate (PGPR), lecithin (bleached or not bleached), sugar esters, emulsifying waxes, polyglycerol fatty acid esters, polysorbates, sorban tristearates (STSs), monoglycerides, diglycerides and combinations of two or more thereof, wherein the chocolate composition has an L* value from 90 to 95, an a* value from −5 to 5, and a b* value from 11 to 14; and wherein the L*a*b* values are achieved without the use of additives or colorings.

2. The composition of claim 1, wherein the cocoa butter has a free fatty acid content of 1.0 wt % or less.

3. The composition of claim 1, wherein the anhydrous milk fat has a yellowness index of from 0.3 to 3.

4. The composition of claim 1, wherein the cocoa butter is present in an amount from 25 to 60 wt % based on the weight of the composition.

5. The composition of claim 1, wherein the anhydrous milk fat is present in an amount from 2 to 10 wt % based on the weight of the composition.

6. The composition of claim 1, wherein the emulsifier comprises ammonium phosphatide.

7. The composition of claim 1, wherein the composition is a white chocolate composition.

8. The composition of claim 7, wherein the white chocolate composition comprises at least 20 wt % cocoa butter, sugar, and at least 14 wt % milk solids of which at least 3.5 wt % is the anhydrous milk fat having a yellowness index of from 0.3 to 5.

9. A chocolate composition comprising:

20 to 70 wt % bleached cocoa butter having a Lovibond red value of less than or equal to 2 and a Lovibond yellow value of less than or equal to 15;

2 to 25 wt % distilled anhydrous milk fat having a yellowness index of 0.3 to 5; and 0.1 to 2.0 wt % ammonium phosphatide, wherein the chocolate composition has an L* value from 90 to 95, an a* value from −5 to 5, and a b* value from 11 to 14; and wherein the L*a*b* values are achieved without the use of additives or colorings.

10. The chocolate composition of claim 9, wherein an amount of ammonium phosphatide in the chocolate composition is equal to or less than 1 wt %.

11. The chocolate composition of claim 9 wherein the Lovibond red value is less than or equal to 0.5 and the Lovibond yellow value is less than or equal to 5.

12. The chocolate composition of claim 9 wherein the distilled anhydrous milk fat has a yellowness index between 0.3 and 2.5.

* * * * *